United States Patent [19]

Ferrini

[11] 4,251,412

[45] Feb. 17, 1981

[54] REDUCING RESIDUAL ACRYLONITRILE IN WATER DISPERSIONS OF ACRYLONITRILE POLYMERS WITH AMINE

[75] Inventor: Gino P. Ferrini, Ravenna, Ohio

[73] Assignee: The B. F. Goodrich Company, Akron, Ohio

[21] Appl. No.: 956,545

[22] Filed: Nov. 1, 1978

[51] Int. Cl.$^3$ .............................................. C08L 33/20
[52] U.S. Cl. .................... 260/29.6 PT; 260/29.6 MN; 260/29.6 AN; 260/29.6 AB; 260/29.6 AQ; 260/29.7 N; 260/29.7 PT; 528/492
[58] Field of Search ............... 260/29.6 PT, 29.6 MN, 260/29.7 N, 29.7 PT, 29.6 AN, 29.6 AB, 29.6 AQ; 528/492

[56] References Cited

U.S. PATENT DOCUMENTS

| 2,697,698 | 12/1954 | Kowolik et al. | 260/29.6 AQ |
| 2,758,003 | 8/1956 | Kleiner et al. | 528/492 |

*Primary Examiner*—Harold D. Anderson
*Attorney, Agent, or Firm*—J. Hughes Powell, Jr.

[57] ABSTRACT

Residual acrylonitrile dissolved in acrylonitrile polymers and/or water in which the acrylonitrile polymers are polymerized or processed or from acrylonitrile processes is reduced to non-detectable amounts by adding to the polymer-water or acrylonitrile mixture at least a stoichiometric amount of an amine which reacts with and reduces the measurable free acrylonitrile content of such mixtures to non-detectable amounts.

5 Claims, No Drawings

REDUCING RESIDUAL ACRYLONITRILE IN WATER DISPERSIONS OF ACRYLONITRILE POLYMERS WITH AMINE

BACKGROUND OF THE INVENTION

Acrylonitrile is the basis for a family of important commercial polymers, for example copolymers of butadiene with less than 50% acrylonitrile provide oil resistant polymers. Copolymers of alkyl acrylates with acrylonitrile provide a range of polymer products, for example when ethyl acrylate is the major component, oil resistant elastomers are obtained; and when acrylonitrile is the predominant comonomer, useful molded plastic materials are obtained. Copolymers of a major proportion of styrene and minor proportions of acrylonitrile are also useful in modifying vinyl chloride polymers, as moldable plastics and as components of ABS resin blends. Normally these acrylonitrile containing polymers are prepared by polymerization in water. Even when such polymerizations are substantially complete, there still remains undesirable amounts of unpolymerized acrylonitrile dissolved both in the polymer and the water. Normal procedures of stripping by vacuuming or steam does not normally remove all of this undesirable acrylonitrile.

SUMMARY OF THE INVENTION

Residual acrylonitrile dissolved in acrylonitrile polymers and/or water in which the acrylonitrile polymers are polymerized or processed or from acrylonitrile processes can be reduced to non-detectable amounts by adding to the polymer-water mixture at least a stoichiometric amount of an amine which reacts with and reduces the measurable free acrylonitrile content of such mixtures to non-detectable amounts.

DETAILED DESCRIPTION

Amines contemplated for use in the process of this invention include alkyl amines and alkanol amines, for example methylamine, ethylamine, isopropyl amine, butylamine, ethanolamine, diethlamine, dimethylamine, ethylenediamine, diethanolamine, and the like. In such amines normally the alkyl group contains from about 1 to 6 carbon atoms and includes both primary and secondary amines. Also found useful were indole and hydroxylamine acid sulfate and hydrochloride. The dialkyl amines are particularly preferred, for example dimethylamine and diethylamine. The amount of amine used should be at least equivalent stoichiometrically to the residual acrylonitrile and more preferably greater than stoichiometric amounts. Good results have been obtained with twice the amount of amine required to react with residual acrylonitrile. Larger amounts could be used; because of cost introduction of large amounts of the amine may be undesirable, lesser amounts to completely remove the residual acrylonitrile are preferred.

The aqueous suspensions or dispersions of acrylonitrile polymers useful in the present invention are obtained by polymerizing acrylonitrile alone, or more normally with other vinylidene comonomers to form copolymers, for example with about 50 weight percent or more of butadiene, up to about 50 weight percent acrylonitrile with about 50–95 weight percent styrene, and about 50–50 weight percent acrylonitrile, with about 1–99 weight percent each of an alkyl acrylate such as methyl acrylate, ethyl acrylate, butyl acrylate, methyl methacrylate and the like; with acrylonitrile in the well-known ABS resins and other copolymers.

Typically, the polymerizable comonomers in addition to butadiene, styrene and an alkyl acrylate or alkacrylate wherein the alkyl group contains 1 to 8 carbon atoms will be vinylidene monomers having at least one terminal $CH_2=C$ group. Polymerizable comonomers useful in the present invention include: other vinyl aromatics as $\alpha$-methyl styrene and chlorostyrene; $\alpha$-olefins such as ethylene, propylene and isobutylene; vinyl halides such as vinyl chloride, vinyl bromide, vinyl fluoride, vinylidene chloride, and vinylidene fluoride; vinyl esters such as vinyl acetate; other $\alpha,\beta$-olefinically unsaturated nitriles as methacrylonitrile; alkyl vinyl ethers such as methyl vinyl ether, isopropyl vinyl ether; n-butyl vinyl ether, isopropyl vinyl ether, and haloalkyl vinyl ethers as 2-chloroethyl vinyl ether; n-octyl methacrylate, dodecyl methacrylate, methyl ethacrylate, ethyl ethacrylate, haloalkyl acrylates as chloropropyl acrylate, amino-acrylates and methacrylates and the like; vinyl ketones; vinyl pyridine, $\alpha,\beta$-olefinically unsaturated amides such as acrylamide, N-methyl acrylamide, N-t-butyl acrylamide, N-cyclohexyl acrylamide, diacetone acrylamide; methacrylamide, and N-ethyl methacrylamide; $\alpha,\beta$-olefinically unsaturated N-alkylol amides having the structural formula

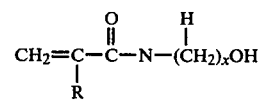

wherein R is a hydrogen or an alkyl group containing from 1 to 4 carbon atoms and x is a number from 1 to 4, such as N-methylol acrylamide, N-ethylol acrylamide, N-propylol acrylamide, N-methylol methacrylamide, and N-ethylol methacrylamide; polyfunctional compounds such as methylene-bis-acrylamide, ethylene glycol dimethacrylate, diethylene glycol diacrylate, allyl pentaerythritol and divinyl benzene; $\alpha,\beta$-olefinically unsaturated carboxylic acid monomers containing from 3 to 10 carbon atoms such as acrylic acid, methacrylic acid, crotonic acid, $\beta$-acryloxy propionic acid, hydrosorbic acid, sorbic acid $\alpha$-chlorosorbic acid, cinnamic acid, $\beta$-styrlacrylic acid, itaconic acid, citraconic acid, maleic acid, fumaric acid, mesaconic acid, glutaconic acid, aconitic acid and the like. The preferred acid monomers are the $\alpha,\beta$-monoolefinically unsaturated monocarboxylic acids such as acrylic acid and methacrylic acid, and the like, as are known to those skilled in the art. Mixtures of one or more of the above-mentioned monomers may be employed if desired.

Generally, the butadiene or alkyl acrylate polymers will contain about 50 to 70% by weight butadiene, or alkyl acrylate wherein the alkyl group contain 1 to 8 carbon atoms, 20 to 45% of acrylonitrile, and up to about 20% by weight of other polymerizable vinylidene comonomers interpolymerized.

The polymer latices may be prepared using any of the conventional polymerization techniques. The emulsifier may be charged at the outset of the polymerization or may be added incrementally or by proportioning throughout the run. Any of the general types of anionic, cationic or nonionic emulsifiers may be employed, however, best results are generally obtained when anionic emulsifiers are used. Typical anionic emulsifiers which may be used include those types known to those skilled in the art, for example, as disclosed beginning on page 102 in J. Van Alphen's "Rubber Chemicals", Elsevier, 1956, for example, the alkali metal or ammonium salts of the sulfates of alcohols containing from 8 to 18 carbon atoms such as, for example, sodium lauryl sulfate; alkali metal and ammonium salts of sulfonated petroleum or paraffin oils; sodium salts of aromatic sulfonic acids such as dodecane-1-sulfonic acid and octadiene-1-sulfonic acid; alkyl aryl sulfonates such as sodium isopropyl benzene sulfonate and sodium dodecyl benzene sulfonate; alkali metal and ammonium salts of sulfonated dicarboxylic acid esters such as sodium dioctyl sulfosuccinate and disodium N-octadecyl sulfosuccinamate; alkali metal or ammonium salts of the free acids of complex organic mono- and diphosphate esters; and the like. So-called nonionic emulsifiers are octyl- or nonylphenyl polyethoxyethanol and the like. Useful as emulsifiers are the alkali metal salts of the aromatic sulfonic acids and the sodium salts of the aromatic sulfonic acids and the sodium salts of the alkyl aryl sulfonates of the formula R-[-Ar—$SO_3$]—$M^+$ wherein R is alkyl or alkenyl having 8 to 20 carbon atoms, Ar is aryl or phenyl or naphthyl and M is the metal ion. In addition to the above-mentioned emulsifiers it may be desirable and advantageous to add post-polymerization emulsifiers and stabilizers to the polymeric anionic latex binders in order to improve the latex stability if it is to be stored for prolonged periods prior to use. Such post-polymerization emulsifiers may be the same as, or different than, the emulsifier employed in conducting the polymerization but preferably are anionic or nonionic surface active agents.

To initiate the polymerization free radical catalysts are employed. The use of such catalysts, although in certain systems not absolutely essential, insure a more uniform and controllable polymerization and a satisfactory polymerization rate. Commonly used free radical initiators include the various peroxygen compounds such as the persulfates, benzoyl peroxide, t-butyl hydroperoxide, cumene hydroperoxide; azo compounds such as azodiisobutyronitrile, and dimethyl azodiisobutyrate; and the like. Especially useful as polymerization initiators are the water-soluble peroxygen compounds such as hydrogen peroxide and the sodium, potassium and ammonium persulfates.

The alkali metal and ammonium persulfate catalysts may be employed by themselves or in activated redox systems. Typical redox systems include the persulfates in combination with: a reducing substance such as a polyhydroxy phenol and an oxidizable sulfur compound such as sodium sulfite or sodium bisulfite, a reducing sugar, a diazomercapto compound, a ferricyanide compound, dimethylaminopropionitrile and the like. Heavy metal ions such as silver, cupric, iron, cobalt, nickel and others may also be used to activate persulfate catalyzed polymerizations. In general the amount of free radical initiator employed will range between about 0.1 to 5% based on the weight of the total monomers. The initiator is generally completely charged at the start of the polymerization, however, incremental addition or proportioning of the initiator throughout the polymerization is often desirable.

In conducting the polymerization for the preparation of the latices of the present invention the monomers are typically charged into the polymerization reactor which contains the water and the emulsifying agent. The reactor and its contents are then heated and the polymerization initiator added. The temperature at which the polymerization is conducted is not critical and may range from about 0° C. to about 80° C. or higher. Excellent results, however, have been obtained when the polymerization temperature is maintained between 5° C. and 60° C. Polymerization modifiers such as the primary, secondary, and tertiary mercaptans, buffers, electrolytes and the like may also be included in the polymerization.

While many amines are effective in removing residual acrylonitrile from aqueous dispersions containing free acrylonitrile, the dialkyl amines are very useful. Such materials include primary and secondary amines wherein the alkyl group contains 1 to 18 carbon atoms. Preferred are amines where the alkyl group contains 1 to 6 carbon atoms. Dimethyl amines and diethyl amines have good utility. Normally the amines will be added to the acrylonitrile containing aqueous dispersions in the form of a water solution. The concentration of the amine in the water will depend to some extent on the stability of the aqueous dispersion of acrylonitrile containing material. In the case of aqueous dispersions or latices, particularly sensitive to the addition of small amounts of salts very dilute solutions may be used. Where with those dispersions or latices particularly stable to the addition of amines, more concentrated solutions may be used, i.e. 30% or higher in water. In the case of sensitive latices, it may be desirable to add additional stabilizers to the latex so that excess amounts of water need not be added with the amines, particularly where the substantially undiluted latex is used as such. This is of less importance where the acrylonitrile polymer is to be coagulated or precipitated or otherwise freed from the water and used in the dry form. An advantage of the process of this invention is that by means of this technique free acrylonitrile dissolved in the polymer particles may also be converted and not be present in undesirable amounts. This technique for decreasing the acrylonitrile content of water systems containing free acrylonitrile may be used widely in the case of acrylonitrile latices. Normally a preferred procedure would be to steam and/or vacuum strip the latex to remove as much acrylonitrile as possible then use the amine to remove the remainder of the acrylonitrile which is difficult or impossible to remove completely by stripping methods. By such combination methods less amine has to be used and less dilution of the latex will be a result.

The process of the invention is equally and even more valuably applied to effluent streams from plants using acrylonitrile wherein there is dissolved in the effluent water trace, or even larger amounts, of undesirable acrylonitrile. By treating such water effluents in accordance with this invention, the undesirable acrylonitrile is converted so as not to be a problem in plant effluence. A further application would be the use of amines as gas scrubbers where gaseous effluents from reactors and the like may contain undesirable acrylonitrile that might be vented to the atmosphere.

Thus the process of the invention will find use in plants where acrylonitrile is manufactured and there may be effluent streams containing undesirable acrylonitrile, in fiber plants where acrylonitrile is a major constituent of the polymers used to make fibers, wherein there may be acrylonitrile containing effluents, ABS plants wherein acrylonitrile is an integral part of ABS polymer and where there may be both latices and effluents containing undesirable acrylonitrile and plants manufacturing both latices or copolymers of butadiene and acrylonitrile and the resulting dry polymers, whereby there may be undesirable plant effluents containing acrylonitrile in addition to the copolymer latex that may thus be treated to reduce the undesirable acrylonitrile content thereof.

EXAMPLES

A series of three commercial elastomeric copolymers of butadiene and acrylonitrile which contained residual acrylonitrile were attained and treated with dimethyl amine to demonstrate the effectiveness of the invention. All of these latices were prepared in aqueous emulsions in water in the presence of some fatty acid soap and a peroxy catalyst. The catalyst with samples (A) and (C) was potassium persulfate and with (B), hydrogen peroxide. In (A) 45 weight parts of acrylonitrile were copolymerized with 55 weight parts of butadiene to a latex total solids content of about 40%, in (B) 33 weight parts of acrylonitrile was copolymerized with 67 weight parts of butadiene, latex total solids content of about 39%, and in (C) 34 weight parts acrylonitrile was copolymerized with 66 weight parts of butadiene, latex total solids content of about 40%. The residual acrylonitrile in milligrams per kilogram of latex for (A) was 12,600; for (B) 1,400 and for (C) 890. The unreacted acrylonitrile content of the latices was determined by gas chromatograph using a flame detector. Aliquot portions of the latices weighing 250 grams were treated with twice the theoretical amount of amine in aqueous solution and allowed to react for two hours. The amounts of reactant was 1.0 grams of dimethyl amines in 200 ml of water solution. This works out to be the equivalent of 100 ml of amine solution is equivalent to one gram of acrylonitrile. After the two hour reaction period samples are tested again in the gas chromatograph and no detectable amounts of acrylonitrile could be determined in any of (A), (B) or (C).

When similar tests are conducted with latices containing for example, 20% total solids of a copolymer of 75 weight percent styrene with 25 weight percent acrylonitrile containing unreacted acrylonitrile on addition of more than equivalent amounts of the amine, no free acrylonitrile can be determined. Likewise, when an ABS latex containing free acrylonitrile is reacted with diethyl amine in the amounts defined no free acrylonitrile is determined by the gas chromatographic analytical method.

I claim:

1. A process for reducing the acrylonitrile content of an aqueous dispersion of an elastomer or plastic acrylonitrile polymer containing free acrylonitrile comprising adding to said dispersion at least a stoichiometric amount of an amine to react with said acrylonitrile.

2. A process of claim 1 wherein an aqueous dispersion of an acrylonitrile copolymer contains free acrylonitrile and the amine is a dialkyl amine.

3. A process of claim 2 wherein there is added to said copolymer dispersion an amount of an amine at least equivalent in weight to the amount of free acrylonitrile present.

4. A process of claim 3 wherein said dispersion is a latex of a copolymer of butadiene and an acrylonitrile in latex form, the alkyl amine is added in greater than an amount equivalent to the free acrylonitrile present and the alkyl groups are primary or secondary amines containing 1 to 6 carbon atoms.

5. A process of claim 4 wherein said alkyl amine is a dimethyl amine present in amount at least twice the equivalent amount of free acrylonitrile present.

* * * * *